Patented Dec. 12, 1950

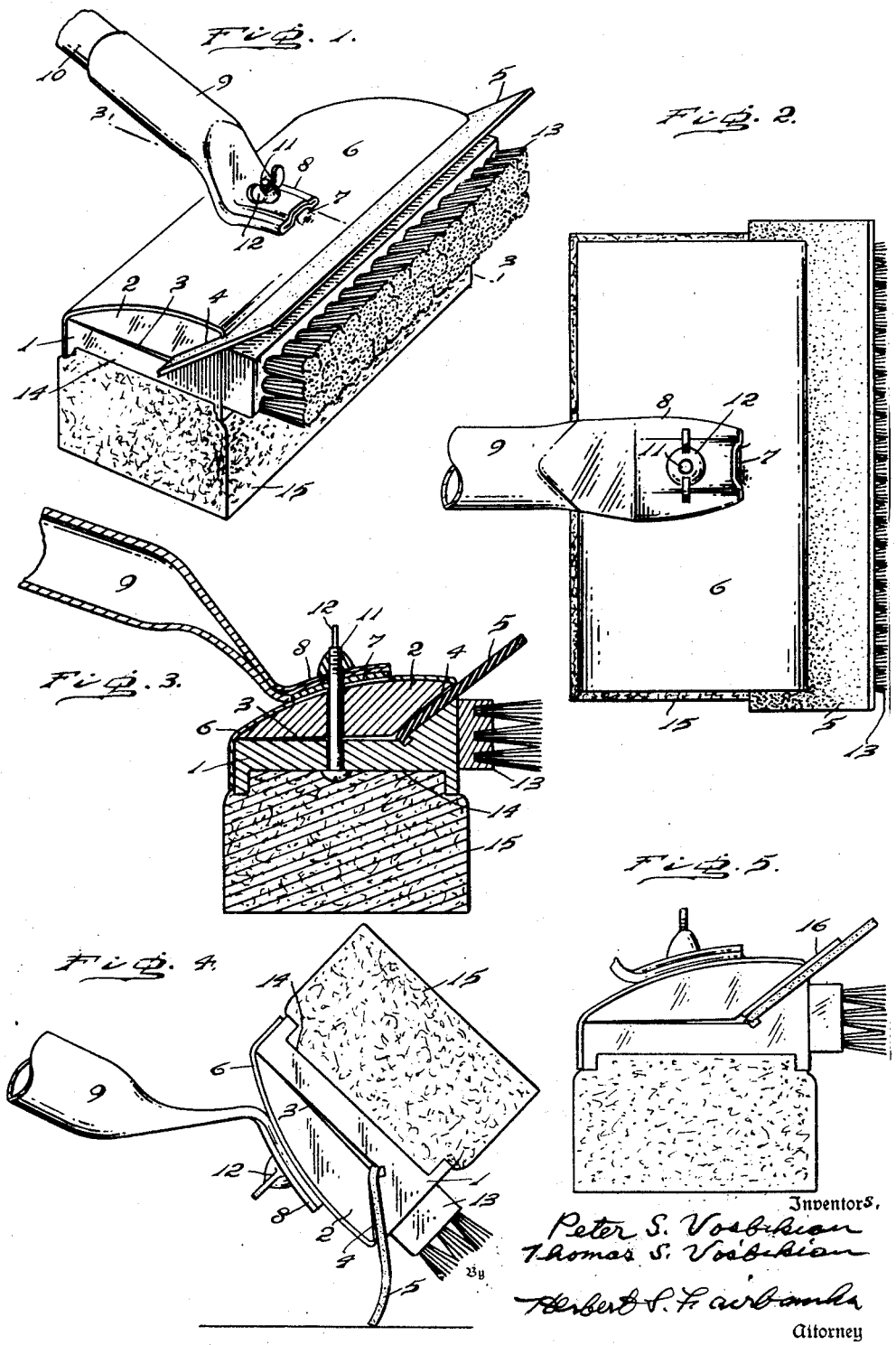

2,534,086

UNITED STATES PATENT OFFICE 2,534,086

WINDOW CLEANER

Peter S. Vosbikian and Thomas S. Vosbikian, Melrose, Pa.

Application January 13, 1948, Serial No. 1,997

2 Claims. (Cl. 15—245)

The object of this invention is to devise a novel window cleaner wherein a rubber wiper strip is fixed in position between sections of the cleaner head or body portion by a bolt which also serves to secure in assembled condition an ornamental cover plate and a handle.

A further object of the invention is to provide the body portion with a brush and with a strip of absorbent material, such as for example sponge rubber.

With the foregoing and other objects in view as will hereinafter clearly appear, our invention comprehends a novel window cleaner.

It further comprehends a novel window cleaner having a novel construction and arrangement of a sectional head between the sections of which a rubber wiper strip is interposed. One of said sections may be provided with a brush and with absorbent material, and a single bolt is employed to retain in assembled condition the head sections, the wiper strip, an ornamental cover and a handle.

For the purpose of illustrating the invention, we have shown in the accompanying drawings a preferred embodiment of it which we have found in practice to give satisfactory and reliable results. It is, however, to be understood that the various instrumentalities of which the invention consists can be variously arranged and organized and the invention is not limited to the exact arrangement and organization of these instrumentalities as herein set forth.

Figure 1 is a perspective view of a window cleaner, embodying our invention.

Figure 2 is a top plan view.

Figure 3 is a section on line 3—3 of Figure 1.

Figure 4 is an end view showing the wiper in position for use.

Figure 5 is a detail view showing the manner in which a stiffening strip may be employed with the wiper strip or blade.

Similar numerals of reference indicate corresponding parts.

Referring to the drawings:

The body portion or head of the cleaner is formed of sections 1 and 2, the juxtaposed faces of which form a straight face 3 and a slot 4 at an angle thereto and adapted to receive a wiper blade in the form of a rubber strip 5. The top face of the section 2 curves rearwardly and downwardly to form a water shed, and is covered with an ornamental strip 6, preferably of aluminum, which also covers the rear face of the section 1. The cover strip 6 is upwardly deflected at its central portion as at 7 to be received in the channel of a plate 8 of the handle socket 9 which receives a handle 10.

A headed bolt 11 passes through the head sections 1 and 2, the cover strip 6 and the plate 8 and is provided with a thumb nut 12 to secure such parts and the wiper blade in assembled condition.

An outer face of the section 1 may have a brush 13 secured to it in any conventional manner, for example by adhesive or fastening devices.

The bottom face of the head section 1 is of channel formation as at 14 to receive absorbent material 15, for example sponge rubber, secured in position in any desired manner, for example by suitable adhesive.

In some case, a stiffening strip 16 may be employed to decrease the flexibility of the wiper blade. The wiper blade can be readily replaced upon loosening the thumb nut and insertion of a new wiper blade.

The head section 1 can be replaced with a new one when the brush or absorbent material have become worn.

The handle is locked in position so that it has no relative side movement with the head.

The manner in which the window cleaner is used will now be apparent to those skilled in this art.

A suitable cleaning material, preferably in solution, is applied to the sponge rubber which is then moved over the surface to be cleaned. If spots remain, then the brush is used. The surplus liquid is removed by the absorbent material. The absorber liquid is removed from the absorbent material by pressing the latter against a pail or screen carried by the pail.

The head sections can be economically fabricated of wood and the cover strip of metal.

It will now be clear that we provide in a single device a cleaner which may act as a scrubber, a liquid absorber and a wiper.

Having thus described our invention, what we claim as new and desire to secure by Letters Patent is:

1. In a window cleaner, a head having its front face substantially vertical, and comprising a top section and a lower section, said sections being constructed and arranged to form a slot therebetween, said slot being angularly inclined relative to the front face of the head, a handle having a portion conforming to the top face of the top section, a headed bolt passing through said head sections and handle portion, a nut for said bolt bearing against said handle portion, and a wiper blade in said slot and clamped between said head sections, 2. In a window cleaner, a head having its front face substantially vertical and comprising a top section and a lower section, said sections being constructed and arranged to form a slot therebetween, said slot being angularly inclined relative to the front face of the head, a wiper blade in said slot, the upper face of said top section curving rearwardly and downwardly from said wiper blade, the lower section being intended to receive cleaning material, a cover plate covering the upper face of the top section and the rear face of the lower section, a handle having its forward end conforming to the contour of the upper face of the top section, and a bolt and nut, the bolt passing through said head sections, the cover plate and the forward end of the handle with the nut bearing against the handle.

PETER S. VOSBIKIAN.
      THOMAS S. VOSBIKIAN.

REFERENCES CITED

The following references are of record in the file of this patent:

UNITED STATES PATENTS

| Number | Name | Date |
|---|---|---|
| 503,668 | McGuire et al. | Aug. 22, 1893 |
| 909,793 | Hening | Jan. 12, 1909 |
| 2,043,775 | Rosen | June 9, 1936 |

FOREIGN PATENTS

| Number | Country | Date |
|---|---|---|
| 175,598 | Switzerland | July 1, 1935 |